United States Patent [19]

Campbell

[11] 3,966,688

[45] June 29, 1976

[54] ARYLENE SULFIDE COPOLYMER PRODUCTION

[75] Inventor: Robert W. Campbell, Bartlesville, Okla.

[73] Assignee: Phillips Petroleum Company, Bartlesville, Okla.

[22] Filed: Dec. 3, 1974

[21] Appl. No.: 529,033

[52] U.S. Cl. .................................. 260/79; 260/79.1; 260/823
[51] Int. Cl.² ........................................ C08G 75/16
[58] Field of Search ..................... 260/79, 79.1, 823

[56] References Cited
UNITED STATES PATENTS 3,415,889   12/1968   Louthan ............................ 260/609
3,607,843   9/1971    Vidaurri, Jr. ......................... 260/79

Primary Examiner—H.S. Cockeram

[57] ABSTRACT

Production of arylene sulfide copolymers comprising contacting under reaction conditions (*a*) a mixture of arylene sulfide polymers with (*b*) an organic amide and (*c*) optionally together with a small amount of an alkali metal sulfide. The resulting copolymers can be cured to products having high thermal stability and good chemical resistance. The cured or uncured products are useful in the production of coatings, films, molded objects, fibers, and the like.

8 Claims, No Drawings

ARYLENE SULFIDE COPOLYMER PRODUCTION

This invention relates to arylene sulfide copolymer compositions and the production thereof. In accordance with another aspect, this invention relates to arylene sulfide copolymers produced from mixtures of arylene sulfide polymers. In accordance with another aspect, this invention relates to arylene sulfide copolymers produced from a mixture of at least two other arylene sulfide polymers, at least one of which is an arylene sulfide copolymer. In accordance with another aspect, this invention relates to the preparation of arylene sulfide copolymers by contacting under reaction conditions a mixture of arylene sulfide polymers with an organic amide. In accordance with yet another aspect, this invention relates to the preparation of arylene sulfide copolymers by contacting under reaction conditions at least two other arylene sulfide polymers, at least one of which is an arylene sulfide copolymer, with an organic amide. In accordance with still another aspect, this invention relates to the preparation of arylene sulfide copolymers comprising contacting a mixture of arylene sulfide homopolymers at an elevated temperature with an organic amide and a small amount of an alkali metal sulfide. In accordance with yet another aspect, this invention relates to the preparation of arylene sulfide copolymers by contacting a mixture of at least two other arylene sulfide polymers, at least one of which is an arylene sulfide copolymer, at an elevated temperature with an organic amide and a small amount of an alkali metal sulfide.

Accordingly, an object of this invention is to provide improved arylene sulfide copolymer compositions.

Another object of this invention is to provide a process for the production of novel arylene sulfide copolymers.

A further object of this invention is to provide arylene sulfide copolymer compositions which possess a combination of desirable properties exhibited by the individual polymer reactants used in the preparation thereof.

Other objects, aspects, and the several advantages of the invention will be apparent to those skilled in the art upon a study of the specification and the appended claims.

In accordance with the invention, a process is provided for the production of arylene sulfide copolymers which comprises contacting a mixture of arylene sulfide polymers under reaction conditions at an elevated temperature with an organic amide.

In accordance with another embodiment of the invention, a process is provided for the production of arylene sulfide copolymers which comprises contacting under reaction conditions a mixture of at least two other arylene sulfide polymers, at least one of which is an arylene sulfide copolymer, at an elevated temperature with an organic amide.

In accordance with another embodiment of the invention, arylene sulfide copolymers are prepared by contacting under reaction conditions a mixture of different arylene sulfide homopolymers at an elevated temperature with an organic amide and a small amount of an alkali metal sulfide to produce at least one arylene sulfide copolymer having repeating units characteristic of those of each of the polymer reactants.

In accordance with still another embodiment of the invention, arylene sulfide copolymers are prepared by contacting under reaction conditions a mixture of at least two arylene sulfide polymers, at least one of which is an arylene sulfide copolymer, at an elevated temperature with an organic amide and a small amount of an alkali metal sulfide to produce at least one arylene sulfide copolymer having repeating units characteristic of those of each of the polymer reactants.

In accordance with one specific embodiment of the invention, phenylene sulfide copolymers are produced by heating a mixture of poly(p-phenylene sulfide), poly(m-phenylene sulfide), N-methyl-2-pyrrolidone, and a small amount of sodium sulfide. The phenylene sulfide copolymer product recovered is separated into two fractions wherein the ratio of p-phenylene units to m-phenylene units in the two copolymer fractions is about 75:25 and 25:75, respectively.

Thus, in accordance with the invention, copolymer products can be prepared which possess a combination of desirable properties exhibited by the individual polymer reactants. Furthermore, copolymer products can be produced which have properties such as solubility and processability that are superior to those of the individual polymer reactants. Also, copolymers with block segments can be obtained which have properties different from those of random copolymers prepared directly from the monomers, the block segments enabling the block copolymer to retain to some degree properties such as crystallinity or ductility characteristic of polymers having the same repeating unit as the basic recurring unit throughout the molecule.

The arylene sulfide polymers, including homopolymers and copolymers, which can be used as reactants in the process of this invention can be prepared by any polymerization procedure applicable to their production. For example, poly(p-phenylene sulfide) can be prepared by subjecting the sodium salt of p-chlorothiophenol to polymerization conditions. Similarly, a mixture comprising p-dichlorobenzene, sulfur, and sodium carbonate can be subjected to polymerization conditions to produce poly(p-phenylene sulfide). However, a preferred process for producing the arylene sulfide polymer reactants employs a dihaloaromatic compound, an alkali metal sulfide, and an organic amide, e.g., as described in U.S. Pat. No. 3,354,129.

The arylene sulfide polymer reactants, regardless of their method of preparation, preferably will have an inherent viscosity, determined at 206°C in 1-chloronaphthalene at a polymer concentration of 0.4 g/100 ml solution, greater than 0.005 and more desirably within the range of about 0.008 to about 0.50. The arylene sulfide polymer reactants should be substantially soluble in the organic amide under the reaction conditions used and should consist substantially of repeating units represented by

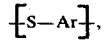

wherein Ar represents an unsubstituted or alkyl-substituted arylene radical such as phenylene, naphthylene, or biphenylene, with or without one or more alkyl substituents, the total number of carbon atoms in each Ar preferably being within the range of 6 to about 20, and wherein each Ar in the polymer molecule can be the same, as in a homopolymer, or wherein the polymer molecule can contain at least two Ar radicals which are of different structure, as in a copolymer.

The organic amides for use in the process of this invention should be substantially liquid at the reaction temperatures and pressures employed. The amides can be cyclic or acyclic and can have 1 to about 10 carbon atoms per molecule. Examples of some suitable amides include formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, ε-caprolactam, N-methyl-ε-caprolactam, N,N'-ethylenedi-2-pyrrolidone, hexamethylphosphoramide, tetramethylurea, and the like, and mixtures thereof.

Alkali metal sulfides which can be employed in the process of this invention include lithium sulfide, sodium sulfide, potassium sulfide, rubidium sulfide, cesium sulfide, and mixtures thereof. The alkali metal sulfide can be used in anhydrous form or as a hydrate.

Although three or four, or even more, arylene sulfide polymers can be used in the process of this invention, generally it is preferred to employ only two arylene sulfide polymers. Although the ratio of each arylene sulfide polymer used to the total arylene sulfide polymers employed can vary over a wide range, each arylene sulfide polymer used generally will make up at least 10 weight percent of the total amount of arylene sulfide polymers employed. The amount of organic amide used can vary over a wide range but generally will be within the range of about 50 to about 2500, preferably about 100 to about 500, grams per gram-atom of sulfur in the total amount of arylene sulfide polymers employed. Although the amount of alkali metal sulfide can vary over a considerable range, the alkali metal sulfide generally will be used in an amount within the range of 0 to about 0.1, preferably about 0.005 to about 0.05, gram-mole per gram-atom of sulfur in the total amount of arylene sulfide polymers employed.

The reaction temperature used in the process of this invention can vary over a wide range but generally will be within the range of about 125°C to about 450°C, preferably about 175°C to about 350°C. The reaction time also can vary considerably, depending in part on the reaction temperature, but generally will be within the range of about 10 minutes to about 3 days, preferably about 1 hour to about 8 hours. The pressure should be sufficient to maintain the organic amide in the liquid phase.

The arylene sulfide copolymers produced by the process of this invention can be separated from the reaction mixture by conventional procedures, e.g., by dilution of the reaction mixture with water, followed by filtration and water washing of the polymer, or by filtration of the polymer, followed by water washing. If desired, the arylene sulfide copolymer products can be separated into component fractions by extraction with organic solvents, e.g., organic amide such as N-methyl-2-pyrrolidone, N,N-dimethylformamide, and N,N-dimethylacetamide, ethers such as tetrahydrofuran, p-dioxane, and dibutyl ether, hydrocarbons such as hexane, benzene, and xylenes, or chlorinated hydrocarbons such as carbon tetrachloride, chloroform, and trichloroethylene, the particular solvent or solvents to be used depending in part on the arylene sulfide copolymer products to be separated.

The arylene sulfide copolymers produced by the process of this invention can be blended with fillers, pigments, extenders, other polymers, and the like. They can be cured through crosslinking and/or chain extension, e.g., by heating at temperatures up to about 480°C in the presence of a free oxygen-containing gas, to provide cured products having high thermal stability and good chemical resistance. They are useful in the production of coatings, films, molded objects, and fibers.

EXAMPLE

In this example, values for glass transition temperature (Tg) and crystalline melting point ($T_m$) were determined on premelted and quenched polymer samples by differential thermal analysis. The values for polymer-melt temperature (PMT) were determined by placing the polymer samples on a heated bar with a temperature gradient. Values for inherent viscosity were determined at 206°C in 1-chloronaphthalene at a polymer concentration of 0.4 g/100 ml solution.

Poly(m-phenylene sulfide) and poly(p-phenylene sulfide), each prepared in accordance with the process of U.S. Pat. No. 3,354,129, were employed in illustration of the invention. The poly(m-phenylene sulfide), prepared by use of m-dichlorobenzene, sodium sulfide, and N-methyl-2-pyrrolidone, had an inherent viscosity of 0.01, a Tg of 15°C, no $T_m$, and a PMT of 100°C. The poly(p-phenylene sulfide), prepared by use of p-dichlorobenzene, sodium sulfide, and N-methyl-2-pyrrolidone, had an inherent viscosity of 0.18, a Tg of 85°C, a $T_m$ of 286°C, and a PMT of 274°C.

To a stirred 1-liter autoclave were charged 1.53 g (0.012 mole, 61.5 percent assay) sodium sulfide, 32.5 g poly(m-phenylene sulfide) containing about 0.30 gram-atom sulfur in the recurring —$C_6H_4S$— units, 32.5 g poly(p-phenylene sulfide) containing about 0.30 gram-atom sulfur in the recurring —$C_6H_4S$— units, and 99.1 g N-methyl-2-pyrrolidone. The mixture was heated to 205°C with stirring under a slow nitrogen flush in 1 hour and 5 minutes. The system was then closed, and the mixture was heated to 245°C in 20 minutes. The mixture was then maintained at 245°C for three hours at a pressure of 0–5 psig, after which the mixture was cooled to about 25°C. The dark brown product was washed with eight 1-liter portions of hot water and dried in a vacuum oven at 80°C to provide 62.5 g (96 percent yield) of a poly(phenylene sulfide) mixture having an inherent viscosity of 0.08, a Tg of 39°C, and a $T_m$ of 271°C.

The above poly(phenylene sulfide) mixture having an inherent viscosity of 0.08 was separated into fractions through use of an extraction technique based on relative solubilities of poly(p-phenylene sulfide), poly(m-phenylene sulfide), and poly(phenylene sulfide) having m-phenylene and p-phenylene units in substantially equal number. More specifically, poly(p-phenylene sulfide) is essentially insoluble in N-methyl-2-pyrrolidone at 100°C and in tetrahydrofuran at 25°C; poly(m-phenylene sulfide) is soluble in N-methyl-2-pyrrolidone at 100°C but insoluble in tetrahydrofuran at 25°C; and poly(phenylene sulfide) having m-phenylene and p-phenylene units in substantially equal number is soluble in N-methyl-2-pyrrolidone at 100°C and in tetrahydrofuran at 25°C. Therefore, 20 g of the above poly(phenylene sulfide) mixture having an inherent viscosity of 0.08 was stirred and heated at 120°C with 150 ml N-methyl-2-pyrrolidone. The resulting slurry was centrifuged hot, and the supernatant liquid was decanted. The insoluble polymer was heated with two additional 150-ml portions of N-methyl-2-pyrrolidone, with centrifugation and decantation after each heating step. The insoluble polymer was then washed in water six times and dried in a vacuum oven at 50°C to provide 9.3 g of poly(phenylene sulfide) having an inherent viscosity of 0.20, a Tg of 61°C, and a $T_m$ of 278°C.

Based on its infrared spectrum, this polymer contained p-phenylene units and m-phenylene units in a ratio of 3:1, respectively. The relatively high $T_m$ (278°C compared with 205°C for a copolymer prepared from a mixture of p-dichlorobenzene and m-dichlorobenzene in a molar ratio of 3:1, respectively, sodium sulfide, and N-methyl-2-pyrrolidone) was indicative of some block character. In view of the absence of a second $T_m$, i.e., a $T_m$ at 286°C, little or no poly(p-phenylene sulfide) remained unreacted.

The combined N-methyl-2-pyrrolidone solutions from which the above insoluble polymer was separated was warmed to about 80°C and filtered using Celite filter aid. Dissolved polymer was then precipitated by mixing the filtrate with approximately 1 liter of water, about 2 g of sodium chloride being added to effect coagulation. The precipitated polymer was filtered, washed 5 times in cold water, and dried at 40°C in a vacuum oven to provide 4.4 g of poly(phenylene sulfide) having an inherent viscosity of 0.02, a Tg of 23°C, no $T_m$, and a PMT of less that 90°C. Based on its infrared spectrum, this polymer contained p-phenylene units and m-phenylene units in a ratio of 1:3, respectively. When 1 g of this polymer was stirred with 20 ml of tetrahydrofuran at about 25°C for 1 hour, all but 0.003 g dissolved, indicating that little, if any, poly(m-phenylene sulfide) remained unreacted.

Thus, phenylene sulfide copolymers containing both p-phenylene and m-phenylene units in the polymer molecule were produced by heating a mixture of poly(p-phenylene sulfide) and poly(m-phenylene sulfide) in N-methyl-2-pyrrolidone, using a small amount of sodium sulfide.

I claim:

1. A process for the production of arylene sulfide copolymers consisting of reacting:
   a. a mixture of different arylene sulfide polymers in which each arylene sulfide polymer present in said mixture makes up at least 10 weight percent of the total amount of arylene sulfide polymers employed and each polymer has an inherent viscosity, determined at 206°C in 1-chloronaphthalene at a polymer concentration of 0.4g/100 ml solution, greater than 0.005, with
   b. at least one organic amide selected from cyclic and acyclic amides having from 1 to 10 carbon atoms per molecule under reaction conditions including an elevated temperature sufficient to produce at least one arylene sulfide copolymer having repeating units characteristic of those of each of the arylene sulfide polymer reactants present in said mixture, and
   c. at least one alkali metal sulfide present in an amount within the range of 0 to about 0.1 gram-mole of alkali metal sulfide per gram-atom of sulfur in the total amount of arylene sulfide polymers in said mixture.

2. A process according to claim 1 wherein (a) is a mixture of arylene sulfide polymers in which at least one of the polymers is an arylene sulfide copolymer.

3. A process according to claim 1 wherein (a) is a mixture of different arylene sulfide homopolymers.

4. A process according to claim 1 wherein (a) is a mixture of poly(m-phenylene sulfide) and poly(p-phenylene sulfide).

5. A process according to claim 1 wherein said reacting is carried out at a temperature in the range of from about 125°C to about 450°C and the amount of (b) present ranges from about 50 to about 2500 grams per gram-atom of sulfur in the total amount of arylene sulfide polymers employed in said mixture and the amount of (c) present ranges from about 0.005 to about 0.05 gram-mole per gram-atom of sulfur in the total amount of arylene sulfide polymers employed in said mixture.

6. A process according to claim 1 wherein (a) is a mixture of at least two arylene sulfide polymers, at least one of which is an arylene sulfide copolymer, at an elevated temperature with an organic amide and from about 0.005 to about 0.05 gram-mole per gram-atom of sulfur in the total amount of arylene sulfide polymers employed in said mixture of an alkali metal sulfide to produce at least one arylene sulfide copolymer having repeating units characteristic of those of each of the polymer reactants.

7. A process according to claim 3 wherein the mixture comprises approximately equal amounts by weight of each of said polymers and the copolymer product produced and recovered is separated into two phenylene sulfide copolymer fractions wherein the ratio of p-phenylene units to m-phenylene units in the two copolymer fractions recovered is about 75:25 and 25:75.

8. The arylene sulfide copolymer produced according to claim 1.

* * * * *